United States Patent
Seo

(10) Patent No.: US 12,054,874 B2
(45) Date of Patent: Aug. 6, 2024

(54) WASHING MACHINE

(71) Applicant: LG ELECTRONICS INC., Seoul (KR)

(72) Inventor: Bo Gil Seo, Seoul (KR)

(73) Assignee: LG Electronics Inc., Seoul (KR)

(*) Notice: Subject to any disclaimer, the term of this patent is extended or adjusted under 35 U.S.C. 154(b) by 249 days.

(21) Appl. No.: 17/611,722

(22) PCT Filed: Jul. 15, 2020

(86) PCT No.: PCT/KR2020/009342
§ 371 (c)(1),
(2) Date: Nov. 16, 2021

(87) PCT Pub. No.: WO2021/010756
PCT Pub. Date: Jan. 21, 2021

(65) Prior Publication Data
US 2022/0213632 A1    Jul. 7, 2022

(30) Foreign Application Priority Data

Jul. 17, 2019   (KR) .................. 10-2019-0086602

(51) Int. Cl.
*D06F 37/42*     (2006.01)
*D06F 33/30*     (2020.01)
(Continued)

(52) U.S. Cl.
CPC .............. *D06F 37/42* (2013.01); *D06F 33/30* (2020.02); *D06F 34/14* (2020.02); *D06F 39/14* (2013.01);
(Continued)

(58) Field of Classification Search
CPC .......... D06F 37/42; D06F 33/30; D06F 34/14; D06F 39/14; D06F 33/47; D06F 33/32;
(Continued)

(56) References Cited

U.S. PATENT DOCUMENTS 10,373,419 B1*  8/2019  Smithson ............. G06Q 20/349
2013/0057702 A1*  3/2013  Chavan ............... H04N 23/6812
                                                                    348/169
(Continued)

FOREIGN PATENT DOCUMENTS

CN        106337263 A       1/2017
EP        2530551 A1       12/2012
(Continued)

OTHER PUBLICATIONS

Office Action in Chinese Appln. No. 202080039913.8, mailed on Feb. 11, 2023, 26 pages (with English translation).
(Continued)

*Primary Examiner* — Michael Lee
(74) *Attorney, Agent, or Firm* — Fish & Richardson P.C.

(57) ABSTRACT

Disclosed is a washing machine. The washing machine includes an image capturer, a storage, and a controller. When the washing machine is in a standby state, if photographed data is identified to be registered user data, the controller recognizes a photographed user as a registered user and performs control such that a door is opened. If the photographed data is identified to be child data, the controller performs control such that, when the door is in an open state, the door is not closed and such that, when the door is in a closed state, the door is not opened.

20 Claims, 12 Drawing Sheets

(51) Int. Cl.
   *D06F 34/14* (2020.01)
   *D06F 39/14* (2006.01)
   *G06V 40/10* (2022.01)
   *G06V 40/16* (2022.01)
   *G10L 15/22* (2006.01)

(52) U.S. Cl.
   CPC .............. *G06V 40/10* (2022.01); *G10L 15/22* (2013.01); *G06V 40/168* (2022.01); *G10L 2015/223* (2013.01)

(58) Field of Classification Search
   CPC ............. D06F 2103/00; D06F 2103/64; D06F 2105/44; D06F 34/04; D06F 34/18; D06F 34/20; D06F 34/28; G06V 40/10; G06V 40/168; G10L 15/22; G10L 2015/223; G01B 11/026; G01B 11/0608; G01B 21/16; G06F 3/167; G06F 18/22; G01G 19/52
   See application file for complete search history.

(56) References Cited

U.S. PATENT DOCUMENTS

| | | | | |
|---|---|---|---|---|
| 2015/0356802 | A1* | 12/2015 | Cho | G07C 9/00563 700/275 |
| 2016/0203304 | A1* | 7/2016 | Bielstein | G06F 3/04842 715/741 |
| 2016/0269411 | A1* | 9/2016 | Malachi | H04L 63/0421 |
| 2017/0085390 | A1* | 3/2017 | Belveal | D06F 35/00 |
| 2018/0066389 | A1 | 3/2018 | Wu et al. | |
| 2018/0305856 | A1* | 10/2018 | Welch | G06Q 20/18 |
| 2019/0012525 | A1* | 1/2019 | Wang | G06V 40/172 |
| 2019/0194856 | A1* | 6/2019 | Mukundala | H04L 12/2803 |
| 2019/0272691 | A1* | 9/2019 | Nye | G07C 9/38 |

FOREIGN PATENT DOCUMENTS

| | | |
|---|---|---|
| KR | 20060120933 | 11/2006 |
| KR | 20100068741 | 6/2010 |
| KR | 20100068741 A | 6/2010 |
| KR | 20140001094 | 2/2014 |
| KR | 20140001094 U | 2/2014 |
| KR | 20140073197 | 6/2014 |
| KR | 20190058172 | 5/2019 |
| KR | 20190058172 A | 5/2019 |
| WO | WO2017128382 | 8/2017 |
| WO | WO2017128382 A1 | 8/2017 |

OTHER PUBLICATIONS

Office Action in European Appln. No. 20841559.6, mailed on Oct. 23, 2023, 15 pages.

* cited by examiner

WASHING MACHINE

CROSS-REFERENCE TO RELATED APPLICATIONS

This application is a National Phase Application under 35 U.S.C § 371 of International Application No. PCT/KR2020/009342, filed on Jul. 15, 2020, which claims the benefit of priority to Korean Patent Application No. 10-2019-0086602, entitled "WASHING MACHINE" filed on Jul. 17, 2019, in the Korean Intellectual Property Office, the entire disclosure of which is incorporated herein by reference.

BACKGROUND

1. Technical Field

The present disclosure relates to a washing machine, and more particularly to a washing machine, the components of which are controlled based on identification of a user.

2. Description of Related Art

A washing machine is an apparatus for washing laundry, such as contaminated clothing. The washing machine generally includes a washing tub, which is configured to receive water, a drum, which is rotatably mounted inside the washing tub and is configured to receive laundry, a motor, which is configured to generate a driving force for rotating the drum, and a door, which is configured to allow laundry to be introduced into the drum.

In such a washing machine, it is required to open or close the door in order to introduce or retrieve laundry into or from the washing machine and to perform a washing operation. In addition, a door safety function for controlling opening and closing of the door is required in order to prevent an accident in which a child or pet becomes trapped inside the washing machine.

In a conventional washing machine, it is not easy for users who have difficulty moving around to open and close a door of the washing machine in order to introduce laundry into the washing machine. In consideration of users who have difficulty moving around, the washing machine may be configured such that the door thereof is automatically opened when a user approaches the washing machine. In this case, however, the door may be automatically opened even when a child approaches the washing machine, which may cause an accident in which the child enters the washing machine.

Also, if the door is unlocked without identification of the user, there is a risk of theft of laundry that must be secured.

In addition, the conventional washing machine may identify a child by measuring the user's height, and may activate a door safety function based thereon. However, it is difficult to accurately identify a child merely by measuring the user's height.

As a related art document, Korean Patent Laid-Open Publication No. 10-2006-0120933 discloses a washing machine that stores user information in memory and identifies a user based thereon. However, the washing machine disclosed in Korean Patent Laid-Open Publication No. 10-2006-0120933 has an inconvenience in which a user needs to transmit information to the washing machine using a communication modem and to store the information in the washing machine so that the washing machine can identify the user. Also, when identifying a user, the conventional washing machine senses a communication device possessed by the user, rather than sensing the person. Thus, there is inconvenience in that only a person possessing a communication device can be recognized as a user of the washing machine.

Also, the washing machine disclosed in Korean Patent Laid-Open Publication No. 10-2006-0120933 does not disclose a configuration for controlling a door of the washing machine based on identification of a user.

SUMMARY OF THE INVENTION

An aspect of the present disclosure is to solve a problem in which a door of a washing machine is not controlled to be opened based on identification of a user who actually desires to use the washing machine and a problem in which a child approaching the washing machine is not accurately sensed and thus there is a risk of an accident in which the child enters the washing machine.

Another aspect of the present disclosure is to solve a problem in which, in the case in which the amount of laundry is large, if the door is unconditionally opened in order to prevent the generation of odors in the laundry after completion of washing operation, the laundry falls out of the washing machine and is thus contaminated.

Still another aspect of the present disclosure is to solve a problem in which a user who is located far from the washing machine is not capable of easily recognizing the operation time of the washing operation.

Still another aspect of the present disclosure is to solve a problem in which a user who has difficulty moving around is not capable of easily opening the door of the washing machine.

Still another aspect of the present disclosure is to solve a problem in which, because the washing machine provides a fixed user interface, individual users are not capable of conveniently using user interfaces preferred thereby.

Still another aspect of the present disclosure is to solve a problem in which a message stored in the washing machine is not accurately delivered to a recipient.

Still another aspect of the present disclosure is to solve a problem in which a user is not capable of easily recognizing the amount of time that laundry has been left unattended after completion of the washing operation, and thus the laundry is left unattended for a long time, and odors are generated in the laundry.

Still another aspect of the present disclosure is to solve a problem in which laundry is stolen by a person other than an owner of the laundry.

Still another aspect of the present disclosure is to solve a problem in which a user needs to purchase a separate washing machine when he or she desires to use a washing machine having a user identification function.

Aspects of the present disclosure are not limited to the above-mentioned aspects, and other technical aspects not mentioned above will be clearly understood by those skilled in the art from the following description.

In order to accomplish the above and other aspects, a washing machine according to an embodiment of the present disclosure includes an image capturer and a controller configured to control a door of the washing machine.

Specifically, the washing machine may include an image capturer configured to capture an image and to transmit image data to a controller, a storage configured to store therein stored data, the stored data including registered user data, which is image data of a registered user, and child data, which is image data of a child, and a controller configured to compare photographed data, which is an image captured by the image capturer, with the stored data to identify whether the photographed data and the stored data are identical to each other and configured to control the components of the washing machine. The controller may compare the registered user data and the child data, which are stored in the storage, with the photographed data. When the photographed user is identified to be the registered user, the controller may perform control such that a door is opened, and when the photographed user is identified to be a child, the controller may perform control such that a door safety function is activated.

In addition, the washing machine may further include a distance detection sensor configured to sense a user and to measure the distance between the washing machine and the user. When the registered user approaches the washing machine, the controller may perform control such that the door is opened.

In addition, the washing machine may further include a height detection sensor configured to measure the height of a user. When the height of the user measured by the height detection sensor is small and thus the user is identified to be a child, the controller may perform control such that the door safety function is activated.

In addition, the washing machine may further include a weight detection sensor configured to measure the weight of laundry or a height detection sensor configured to measure the height of the laundry. After washing operation is completed, the controller may perform control such that the door is opened according to the amount of the laundry.

In addition, the washing machine may have a voice recognition function to recognize the user's voice. The controller may control opening and closing of the door based on the recognized user's voice, and may recommend the user to store image data as the registered user.

In addition, when the user approaches the washing machine after completion of the washing operation, the controller may provide information on completion of the washing operation and the amount of time that the laundry has been left unattended.

In addition, when a non-registered user approaches the washing machine before the washing operation starts and after the washing operation ends, the controller may inquire the user about whether to open the door, and may open the door in response to a command input by the non-registered user.

In addition, the image capturer may be configured so as to be freely mounted to and demounted from the washing machine.

In addition, the storage may store therein a user who introduces laundry into the washing machine and operates the washing machine as a washing machine user. Only when the washing machine user approaches the washing machine after completion of the washing operation, the controller may perform control such that the door is opened.

In order to accomplish the above and other aspects, a washing machine according to an embodiment of the present disclosure includes an image capturer, a storage, a controller, and a display.

Specifically, the washing machine may include an image capturer configured to capture an image, a storage configured to store therein registered user data, which is image data of a registered user, and data on a registered user interface, which is a user interface changed and set by the registered user, as stored data, a controller configured to compare photographed data, which is image data captured by the image capturer, with the stored data to identify whether the photographed data and the stored data are identical to each other, and a display configured to display information on washing operation on a screen thereof. When the photographed data is the registered user data, the controller may change the user interface of the washing machine to the stored registered user interface.

In addition, the washing machine may further include a distance detection sensor configured to sense a user and to measure the distance between the washing machine and the user. The controller may perform control such that the configuration of the screen of the display changes according to the distance between the washing machine and the user.

In addition, as the distance between the washing machine and the user increases, the controller may perform control such that the operation time of the washing operation is displayed in a larger size on the display, and as the distance between the washing machine and the user decreases, the controller may perform control such that a washing operation manipulation button provided in the display is activated and such that the operation time of the washing operation is displayed in a smaller size on the display.

In addition, when a non-registered user approaches the washing machine during the washing operation, the controller may perform control such that the display provides information about the washing machine user.

In addition, the washing machine may further include a voice output interface. When a non-registered user is sensed, the controller may recommend the non-registered user to store registered user image data in the washing machine by outputting a sound expressed in a human language through the voice output interface.

In addition, the storage may change the sound of the voice output interface and may store therein the same as the registered user interface.

In addition, when a non-registered user operates the washing machine, the controller may provide a preset default user interface.

In addition, the washing machine may have a voice recognition function. When the user designates a recipient and stores a voice message or an image message in the storage, the controller may identify the designated recipient and may deliver the voice message or the image message to the designated recipient.

Details of other embodiments for achieving the technical solutions are included in the description and drawings of the disclosure.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
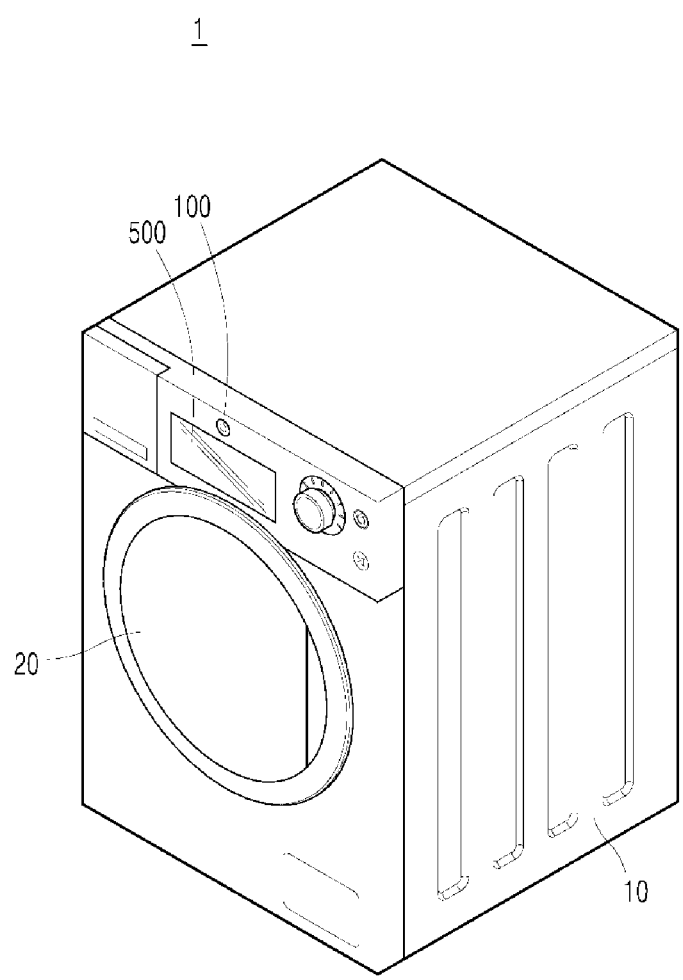
FIG. 1 is a perspective view illustrating a washing machine according to an embodiment of the present disclosure.

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. Like reference numerals designate like elements throughout the specification. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Hereinafter, a washing machine of the present disclosure will be described.

Figure 2:
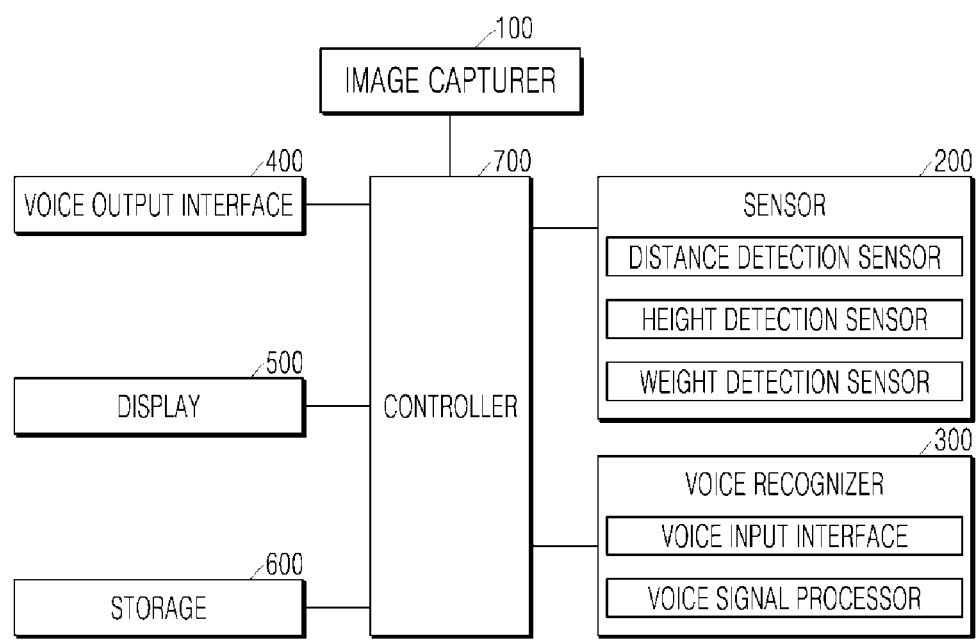
FIG. 2 is a block diagram illustrating a part of a washing machine according to the present disclosure.

FIG. 1 is a perspective view illustrating a washing machine according to an embodiment of the present disclosure, and FIG. 2 is a block diagram illustrating a part of a washing machine according to the present disclosure.

Referring to FIGS. 1 and 2, a washing machine 1 of the present disclosure includes a main body 10, a door 20, an image capturer 100, a sensor 200, a voice recognizer 300, a voice output interface 400, a display 500, a storage 600, and a controller 700. The main body 10 and the door 20 may be configured as a main body and a door of a conventional washing machine.

First, the configuration of the image capturer 100 will be described.

The image capturer 100 is provided to capture an image of the surroundings of the washing machine 1, and may include a photographing device such as a conventional camera, which is mounted in the outer surface of the main body 10 so as to expose a lens. In addition, the image capturer 100 may include a depth camera (a TOF camera) having a function for measuring the distance to an object. Image data on the image captured by the image capturer 100 (hereinafter referred to as a "photographed data") may be transmitted to the storage 600 and the controller 700.

The image capturer 100 may be mounted such that a lens of a camera is exposed at any of various positions in the main body 10 in order to effectively acquire image data on the surroundings of the washing machine 1. In one example, a lens of a camera constituting the image capturer 100 may be mounted so as to be exposed at an upper center position in the surface of the main body 10 in which the door 20 is mounted.

In addition, the image capturer 100 may be configured to be inactivated in a state before the washing machine 1 operates and a state after the washing machine 1 completes washing (hereinafter referred to as a "standby state").

The image capturer 100 may be configured so as to be freely mounted to and demounted from the washing machine of the present disclosure.

Figure 3:
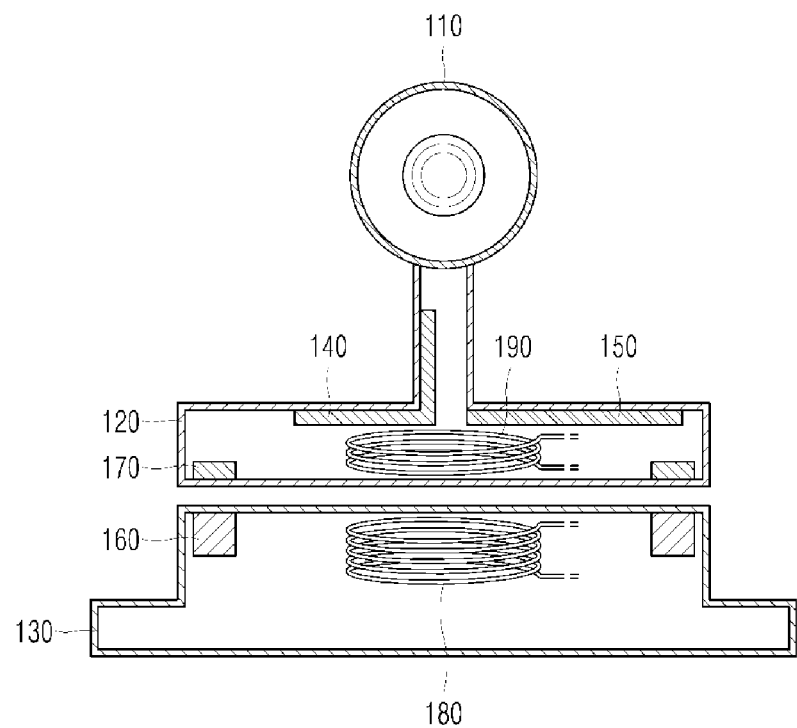
FIG. 3 is a front view illustrating an example of an image capturer configured so as to be detachably mounted to the washing machine of the present disclosure.

FIG. 3 is a front view illustrating an example of the image capturer configured so as to be detachably mounted to the washing machine of the present disclosure.

Referring to FIG. 3, the image capturer 100 may include a lower box 130, which is made of a non-magnetic material, and an upper box 120, which includes a camera 110 and is made of a non-magnetic material. The lower box 130 and the upper box 120 may be freely attached to and detached from each other by means of a magnetic coupling element. As an example of the magnetic coupling element, a permanent magnet 160 may be provided in the lower box 130, and a magnetic body 170, which is configured to receive magnetic force of the permanent magnet 160, may be provided in the upper box 120.

The upper box 120 may be provided therein with a wireless communication module 140 to transmit data received from the camera 110 to the outside. Also, the upper box 120 may be provided therein with a battery 150 to supply power for operating the camera 110 and the wireless communication module 140. The battery 150 may be charged by means of a wireless charging element using a coil or the like.

For example, the wireless charging element may include an upper coil 190 provided in the upper box 120 and a lower coil 180 provided in the lower box 130. The wireless charging element is preferably mounted so as to be spaced apart from the magnetic coupling element in order to effectively charge the battery 150.

A user may mount the lower box 130 in the washing machine 1, and may freely mount and demount the upper box 120 to and from the lower box 130. Alternatively, a user may mount the lower box 130 in a space near the washing machine 1, and may freely mount and demount the upper box 120 to and from the lower box 130.

Next, the configuration of the sensor 200 will be described.

Referring to FIG. 2, the sensor 200 is configured to sense a user who moves around the washing machine 1 and to measure the distance between the washing machine 1 and the user, the height of the user, the height of laundry introduced into the washing machine 1, and the weight of laundry introduced into the washing machine 1.

For example, the sensor 200 may include a conventional distance detection sensor capable of sensing motion of an object and measuring the distance between objects, a conventional height detection sensor capable of measuring the height of an object, and a conventional weight detection sensor capable of measuring the weight of laundry.

Specifically, the distance detection sensor may be mounted in the washing machine 1 in order to sense a user moving around the washing machine 1 and to measure the distance between the washing machine 1 and the user. Also, the height detection sensor may be mounted in the washing machine 1 in order to measure the height of the user. Also, the weight detection sensor may be mounted in the washing machine 1 in order to measure the weight of laundry introduced into the washing machine 1. In addition, a separate height detection sensor may be mounted inside the washing machine 1 in order to measure the height of laundry introduced into the washing machine 1.

Data obtained by the sensor 200, such as the distance between the washing machine 1 and the user, the height of the user, the weight of the laundry, and the height of the laundry, may be transmitted to the storage 600 and the controller 700.

Next, the configurations of the voice recognizer 300 and the voice output interface 400 will be described.

The voice recognizer 300 is configured to recognize a user's voice and to transmit a command for controlling the components of the washing machine 1 to the controller 700 based on the recognized user's voice, or to output the result of controlling the components of the washing machine 1 by the controller 700 so that the user is capable of recognizing the same. The voice recognizer 300 may be configured as a conventional voice recognition device.

The voice output interface 400 is configured to output a sound expressed in a human language or a warning sound (hereinafter referred to as a voice). The voice output interface 400 may be configured as a well-known speaker or a well-known microphone, which is provided in the conventional washing machine. The voice output from the voice output interface 400 may take various different sound forms.

Figure 4:
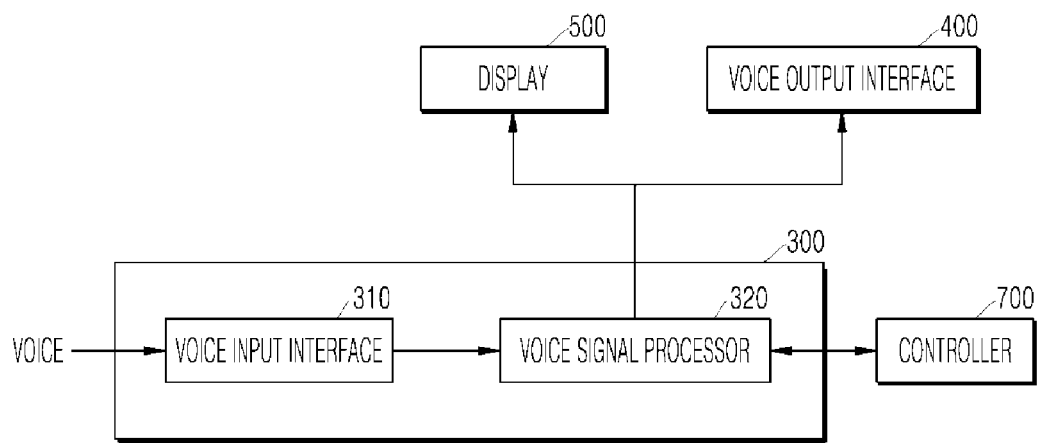
FIG. 4 is a block diagram illustrating an example of a voice recognition control system of the present disclosure.

FIG. 4 is a block diagram illustrating an example of a voice recognition control system of the present disclosure.

Referring to FIG. 4, the voice recognizer 300 may include a voice input interface 310, which receives the user's voice, and a voice signal processor 320, which transmits voice data transmitted from the voice input interface 310 or a command for controlling a washing operation, which is detected based on the voice data transmitted from the voice input interface 310, to the controller 700.

When the controller 700 controls the components of the washing machine 1 based on the command transmitted from the voice signal processor 320, the voice signal processor 320 may receive the result of control, and may output the same in the form of a sound through the voice output interface 400 or in the form of visual information through the screen of the display 500 so that the user is capable of recognizing the same.

Next, the configuration of the display 500 will be described.

Referring to FIG. 2, the display 500 is configured to output information and image data on the overall operation of the washing machine 1 (hereinafter referred to as "washing operation"), including a washing process, a rinsing process, a dehydrating process, and a drying process (hereinafter collectively referred to as "basic processes") and further including parameters required to perform each of the basic processes, such as time, intensity, and temperature, on the screen so that the user is capable of recognizing the same. The display 500 may be mounted in the outer surface of the main body 10 of the washing machine 1.

In addition, the display 500 is configured as any of various well-known devices, such as a liquid crystal display (LCD), a light-emitting diode (LED), and a touch panel. Accordingly, the display 500 may activate a washing operation manipulation button when the user applies a predetermined magnitude of force or touch (hereinafter referred to as "touch input") to the display 500.

In addition, the display 500 may be configured to freely change the configuration of the screen for displaying information on the washing operation.

Figure 5:
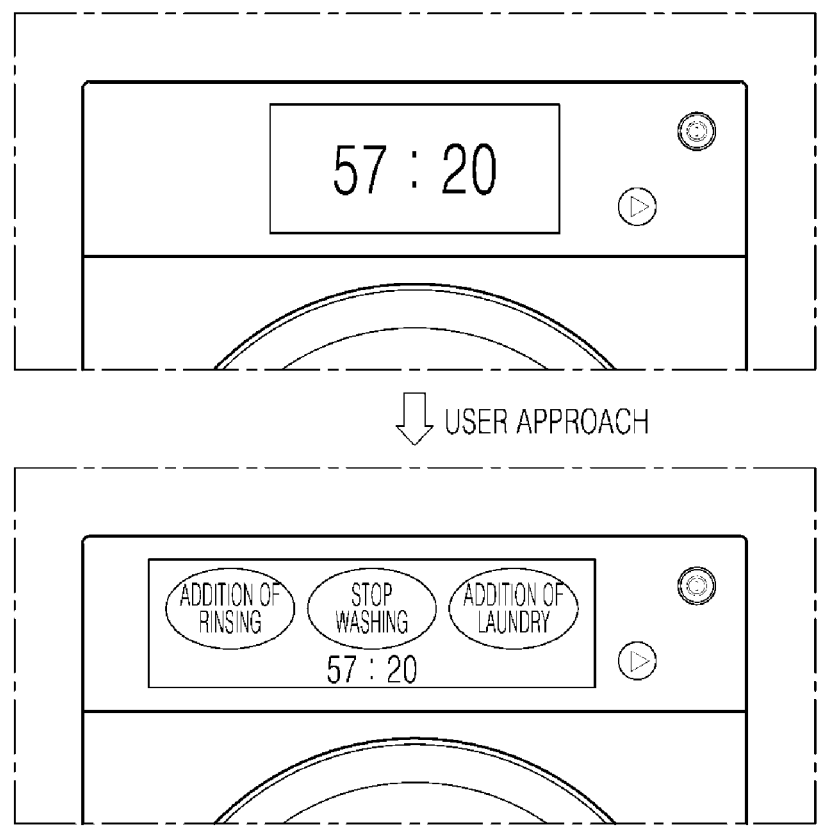
FIG. 5 is a view illustrating an example of the display shown in FIG. 2, in which the configuration of a screen changes according to the distance to a user.
Figure 6:
FIG. 6 is a view illustrating an example of the display shown in FIG. 2, which displays a message indicating completion of washing operation.

FIG. 5 is a view illustrating an example of the display shown in FIG. 2, in which the configuration of the screen changes according to the distance to the user, and FIG. 6 is a view illustrating an example of the display shown in FIG. 2, which displays a message indicating completion of the washing operation.

Referring to FIG. 5, the display 500 may display information on time, such as the elapsed time or the remaining time of the washing operation of the washing machine 1 (hereinafter referred to as an "operation time"), in a large size or small size, and may activate or inactivate the washing operation manipulation button.

Referring to FIG. 6, the display 500 may display a message indicating completion of the washing operation and the amount of time that has elapsed since the time of completion of the washing operation (hereinafter referred to as an "unattended time") in alphanumeric form.

Next, the configuration of the storage 600 will be described.

The storage 600 may store therein various data, including voice data and image data, as stored data, and may be configured as a well-known data storage element.

The storage 600 may store therein image data, voice data, and user interface data specially designated by the user.

First, an example in which image data designated by the user is stored in the storage 600 will be described. In order to register himself or herself in the washing machine 1 as a user authorized to use the washing machine 1 (hereinafter referred to as a "registered user"), the user may designate an image of the user captured by the image capturer 100 as image data of the registered user (hereinafter referred to as "registered user data"), and may store the registered user data in the storage 600.

In another example, in order to register a child in the washing machine 1, the user may designate an image of the child captured by the image capturer 100 as image data of the child (hereinafter referred to as "child data"), and may store the child data in the storage 600.

In still another example, in order to register himself or herself as a user who has introduced laundry into the washing machine 1 and has set the washing operation (hereinafter referred to as a "washing machine user"), the user may designate an image of the user captured by the image capturer 100 immediately before starting the washing operation as image data of the washing machine user (hereinafter referred to as "washing machine user data"), and may store the washing machine user data in the storage 600.

Also, in order to designate a recipient and to transmit an image message to the recipient, the user may capture an image data using the image capturer 100, may designate the recipient to receive the image message from among registered users, and may store the image data and the recipient in the storage 600.

Next, an example in which voice data designated by the user is stored in the storage 600 will be described. In order to designate a recipient and to store a voice message, the user may input a voice message through the voice recognizer 300, may designate the recipient to receive the voice message from among registered users, and may store the voice message and the recipient in the storage 600.

Finally, an example in which user interface data designated by the user is stored in the storage 600 will be described. In order to store a specific user interface, the registered user may designate a user interface, such as a sound that is output from the voice output interface 400 or visual information that is output from the display 500, which was changed by the registered user, as the registered user interface, and may store the registered user interface in the storage 600.

Also, an example of a method of designating image data, voice data, and user interface data as specific data and storing the specific data by the user will be described. The user may designate the specific image data captured by the image capturer 100, the specific voice data input through the voice recognizer, or the specific user interface data changed and set by the user as the specific data by manipulating and touching the manipulation button provided in the display 500, and may store the specific data.

Next, the configuration of the controller 700 will be described.

The controller 700 may identify whether multiple pieces of data are identical to each other by comparing the multiple pieces of data with each other, and may determine the magnitude of numerical values, such as distances, by comparing a numerical value of data, such as a distance measured by the sensor 200, and a numerical value of data, such as a preset distance, with each other.

In addition, the controller 700 may control the components of the washing machine 1 based on the result of measurement by the sensor 200 and a user identification function that is executed by identifying the voice data recognized by the voice recognizer 300 (hereinafter referred to as an "identification function").

Hereinafter, an example of the identification function of the controller 700 will be described. The controller 700 may compare, contrast, and analyze the image data captured by the image capturer 100 and input to the controller 700 and the specific image data stored in the storage 600, and may identify whether the image data and the specific image data are identical to each other.

For example, the controller 700 may analyze the body features, such as a face contour, a height, a skin color, and a hair color, based on the image data stored in the storage 600, such as the registered user data, the child data, and the washing machine user data. Also, when the image capturer 100 photographs a user present in the vicinity of the washing machine 1, the controller 700 may analyze the body features based on image data of the photographed user, and may compare the image data of the photographed user with the image data stored in the storage 600 to identify whether the two pieces of image data are identical to each other.

As a result of the comparison, if it is identified that the image data of the user photographed by the image capturer 100 is identical to the registered user data, the child data, or the washing machine user data stored in the storage 600, the controller 700 may recognize the photographed user as the registered user, the child, or the washing machine user.

Next, examples in which the controller 700 controls the door 20 will be described with reference to the drawings.

Figure 7:
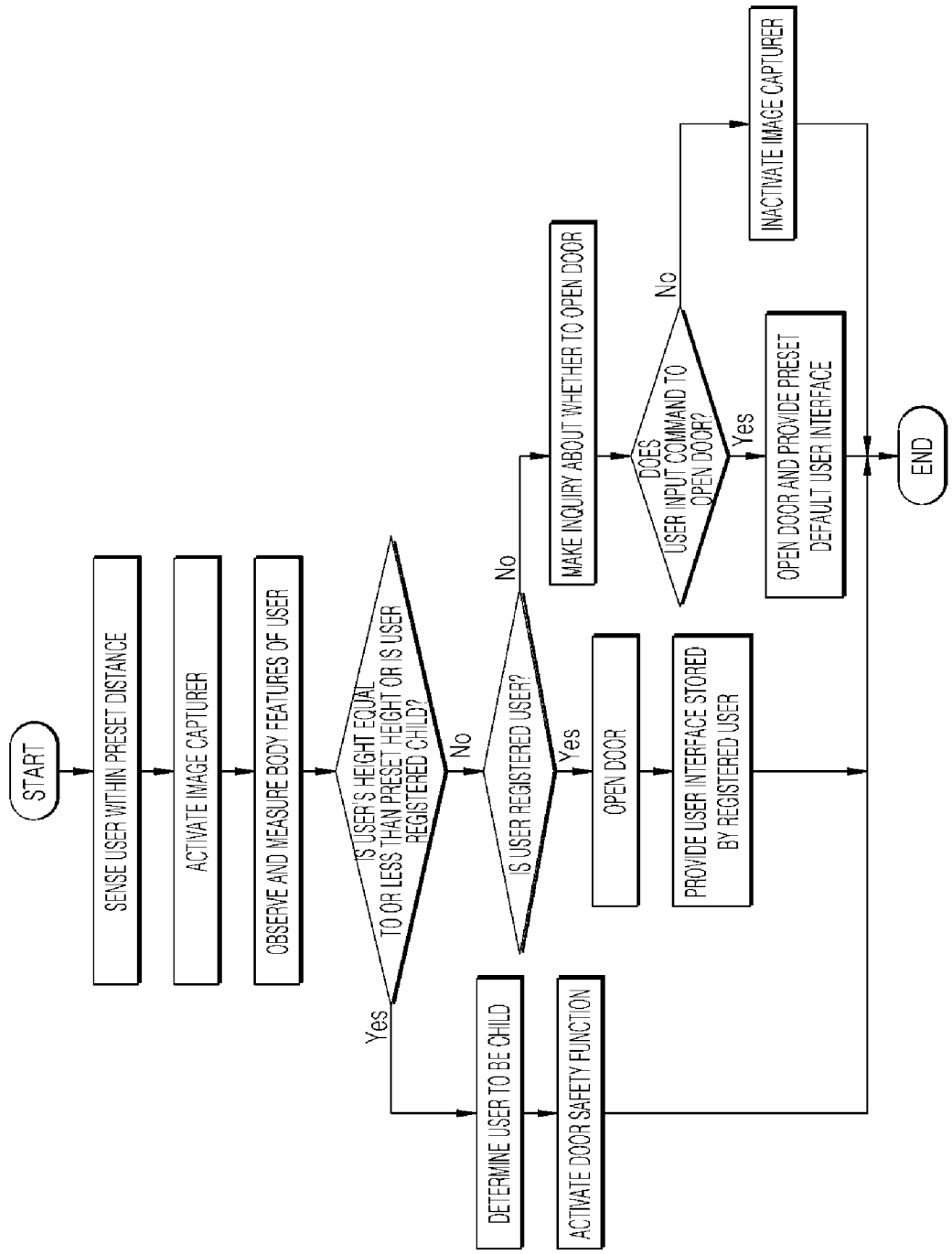
FIG. 7 is a flowchart illustrating an example of operation of the washing machine according to the present disclosure, which is performed when a user approaches the washing machine in order to start a washing operation.

FIG. 7 is a flowchart illustrating an example of the operation of the washing machine according to the present disclosure, which is performed when a user approaches the washing machine in order to start a washing operation.

Referring to FIG. 7, the sensor 200 measures the height of a user (hereinafter referred to as a "start-time user") who is sensed within a preset specific distance (hereinafter referred to as a "preset proximity distance") from the washing machine 1, and the image capturer 100 captures an image of the start-time user. When the measured height of the start-time user is equal to or lower than a preset specific height (hereinafter referred to as a "preset safety height"), or when the start-time user is identified to be a child by the identification function of the controller 700, the controller 700 may perform control such that a safety function of the door 20 (hereinafter referred to as a "door safety function") or a child lock function is activated in order to protect the child.

Hereinafter, an example of the door safety function will be described. When a child approaches the washing machine 1 in the state in which the door 20 is open, the child may enter the washing machine. Therefore, in order to enable the child to escape from the washing machine 1 or to prevent the washing machine 1 from operating in the state in which the child remains in the washing machine 1, the controller 700 may perform control such that the door 20 is not closed.

Also, when a child approaches the washing machine 1 in the state in which the door 20 is closed, if the door 20 is opened, the child may enter the washing machine 1. Therefore, in order to prevent the child from entering the washing machine 1, the controller 700 may perform control such that the door 20 is not opened.

The configuration for controlling the door 20 to be automatically opened or the configuration for controlling the door 20 not to be closed may employ the configuration of a conventional door-opening member that controls automatic opening and closing of a door of a washing machine. For example, the configuration for automatically opening and closing a door of a washing machine disclosed in Korean Patent Laid-Open Publication No. 1997-0043488 may be employed. In another example, the door 20 may include an elastic member such as a spring, which is compressed when the door 20 is closed and which applies elastic force to the door 20 so that the door 20 is opened when closing of the door 20 is released.

The child lock function is a function for preventing a child from manipulating the washing machine 1 by inactivating the manipulation button of the washing machine 1 or preventing the washing machine 1 from operating even when the child touches the manipulation button of the washing machine 1. The washing machine 1 of the present disclosure may employ a well-known child lock configuration.

On the other hand, when the measured height of the start-time user exceeds the preset safety height and when the start-time user is identified not to be a child by the identification function of the controller 700, the controller 700 identifies whether the start-time user is the registered user.

Upon identifying that the start-time user is the registered user, the controller 700 performs control such that the door 20 is opened. However, upon identifying that the start-time user is not the registered user, the controller 700 performs control such that the door 20 is not opened and such that an inquiry about whether to open the door 20 is output in the form of a voice through the voice output interface 400 or in the form of visual information through the screen of the display 50. In this case, when the start-time user inputs a command to open the door 20, the controller 700 performs control such that the door 20 is opened based on the voice recognized by the voice recognizer 300.

Figure 9:
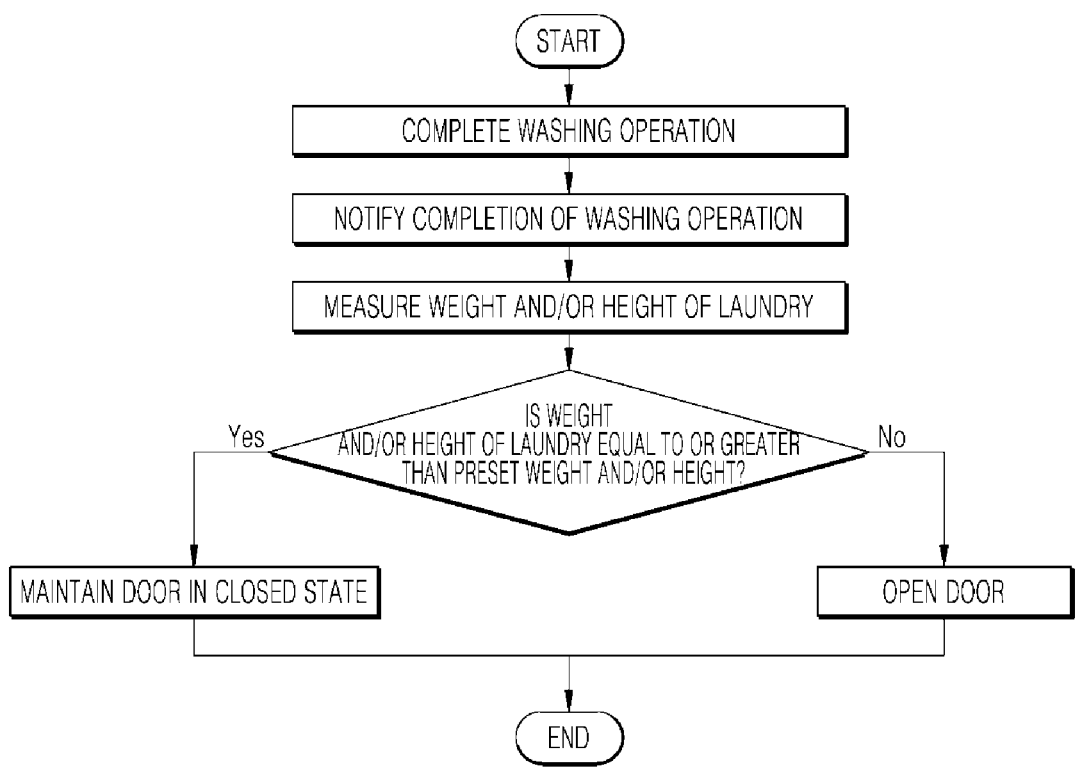
FIG. 9 is a flowchart illustrating an example of operation of the washing machine according to the present disclosure in which opening and closing of a door is controlled according to the amount of laundry after the washing operation is completed.

FIG. 9 is a flowchart illustrating an example of the operation of the washing machine according to the present disclosure in which opening and closing of the door is controlled according to the amount of laundry after the washing operation is completed.

Referring to FIG. 9, after the washing operation is completed, the weight and/or the height of the laundry in the washing machine 1 is measured by the sensor 200. When the measured weight of the laundry is less than a weight set as a reference indicating an amount of laundry that will not fall out of the washing machine when the door 20 is opened (hereinafter referred to as a "preset reference weight"), the controller 700 performs control such that the door 20 is opened.

When the measured height of the laundry is less than a height set as a reference indicating an amount of laundry that will not fall out of the washing machine when the door 20 is opened (hereinafter referred to as a "preset reference height"), the controller 700 performs control such that the door 20 is opened.

On the other hand, when the measured weight of the laundry is equal to or greater than the preset reference weight, or when the measured height of the laundry is equal to or greater than the preset reference height, the controller 700 performs control such that the door 20 is maintained in the closed state.

Figure 10:
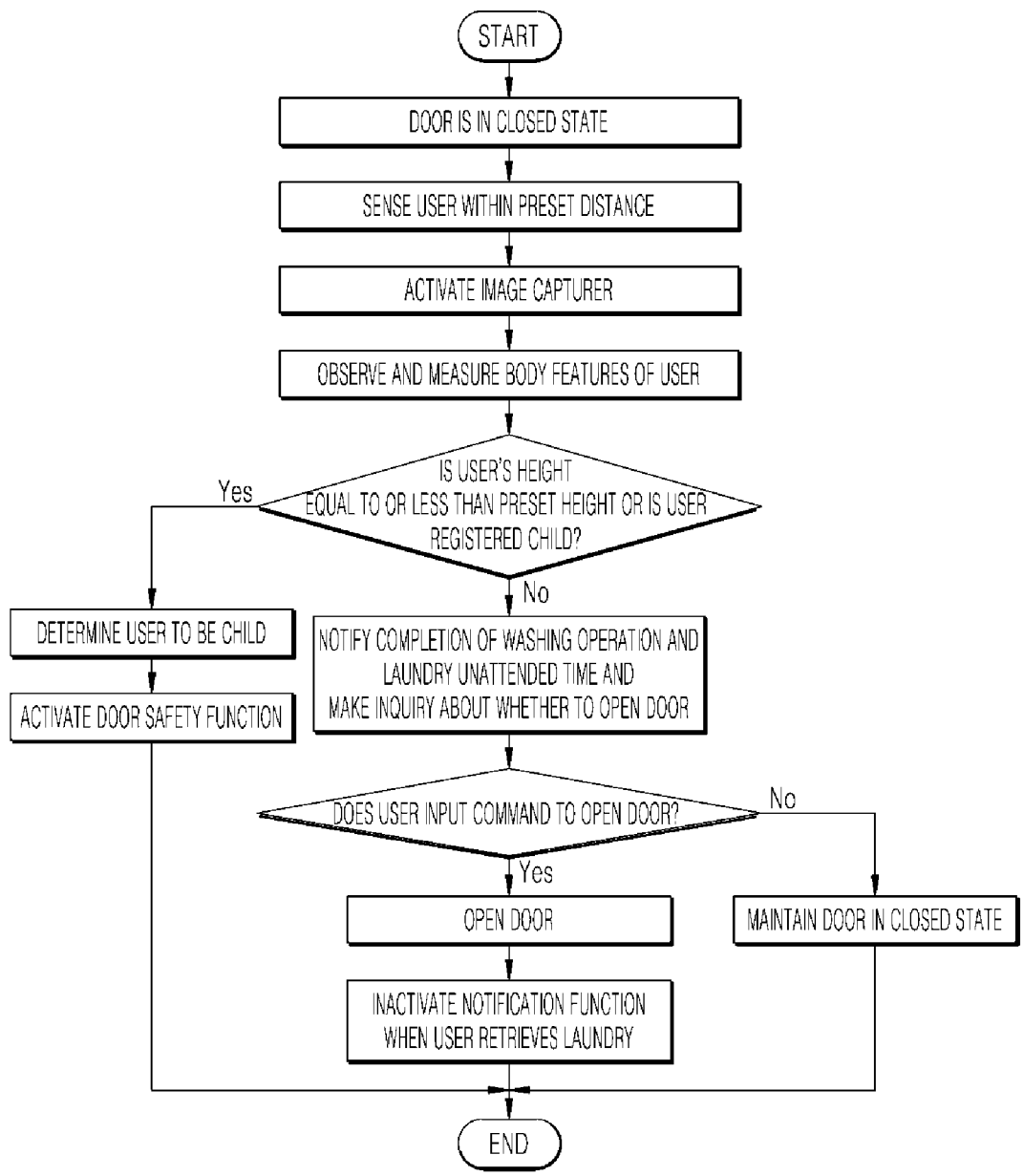
FIG. 10 is a flowchart illustrating an example of operation of the washing machine according to the present disclosure, which is performed when a user approaches the washing machine in the state in which the door is closed after the washing operation is completed.

FIG. 10 is a flowchart illustrating an example of the operation of the washing machine according to the present disclosure, which is performed when a user approaches the washing machine in the state in which the door is closed after the washing operation is completed.

Referring to FIG. 10, in the state in which the door 20 is closed after the washing operation is completed, when a user who is present within the preset proximity distance from the washing machine 1 (hereinafter referred to as a "first end-time user") is sensed, the sensor 200 measures the height of the first end-time user, the image capturer 100 captures an image of the first end-time user, and the controller 700 identifies whether the first end-time user is a child.

When the measured height of the first end-time user is equal to or less than the preset safety height, or when the first end-time user is identified to be a child by the identification function of the controller 700, the controller 700 performs control such that the door safety function is activated.

On the other hand, when the measured height of the first end-time user exceeds the preset safety height and when the first end-time user is identified not to be a child by the identification function of the controller 700, the controller 700 performs control such that a message indicating completion of the washing operation and the unattended time are output in the form of a voice through the voice output interface 400 or in the form of visual information through the screen of the display 500. Also, the controller 700 performs control such that an inquiry about whether to open the door 20 is output to the first end-time user in the form of a voice through the voice output interface 400 or in the form of visual information through the screen of the display 500.

In this case, when the first end-time user inputs a command to open the door 20, the controller 700 performs control such that the door 20 is opened based on the voice recognized by the voice recognizer 300. However, when the first end-time user does not input a command to open the door 20, the controller 700 performs control such that the door 20 is maintained in the closed state.

Figure 11:
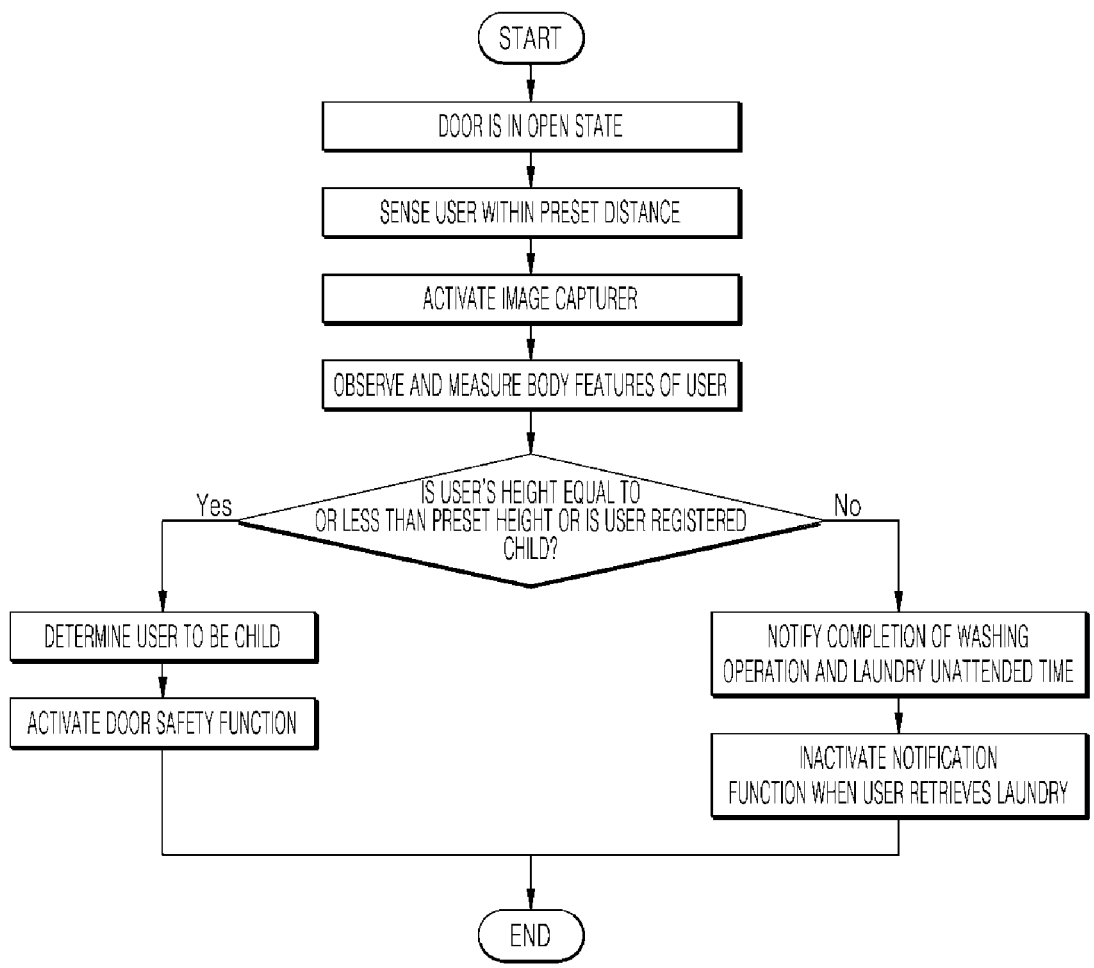
FIG. 11 is a flowchart illustrating an example of operation of the washing machine according to the present disclosure, which is performed when a user approaches the washing machine in the state in which the door is open after the washing operation is completed.

FIG. 11 is a flowchart illustrating an example of the operation of the washing machine according to the present disclosure, which is performed when a user approaches the washing machine in the state in which the door is open after the washing operation is completed.

Referring to FIG. 11, in the state in which the door 20 is open after the washing operation is completed, when a user who is present within the preset proximity distance from the washing machine 1 (hereinafter referred to as a "second end-time user") is sensed, the sensor 200 measures the height of the second end-time user, the image capturer 100 captures an image of the second end-time user, and the controller 700 identifies whether the second end-time user is a child.

When the measured height of the second end-time user is equal to or less than the preset safety height, or when the second end-time user is identified to be a child by the identification function of the controller 700, the controller 700 performs control such that the door safety function is activated.

On the other hand, when the measured height of the second end-time user exceeds the preset safety height and when the second end-time user is identified not to be a child by the identification function of the controller 700, the controller 700 performs control such that a message indicating completion of the washing operation and the unattended time are output in the form of a voice through the voice output interface 400 or in the form of visual information through the screen of the display 500.

Figure 12:
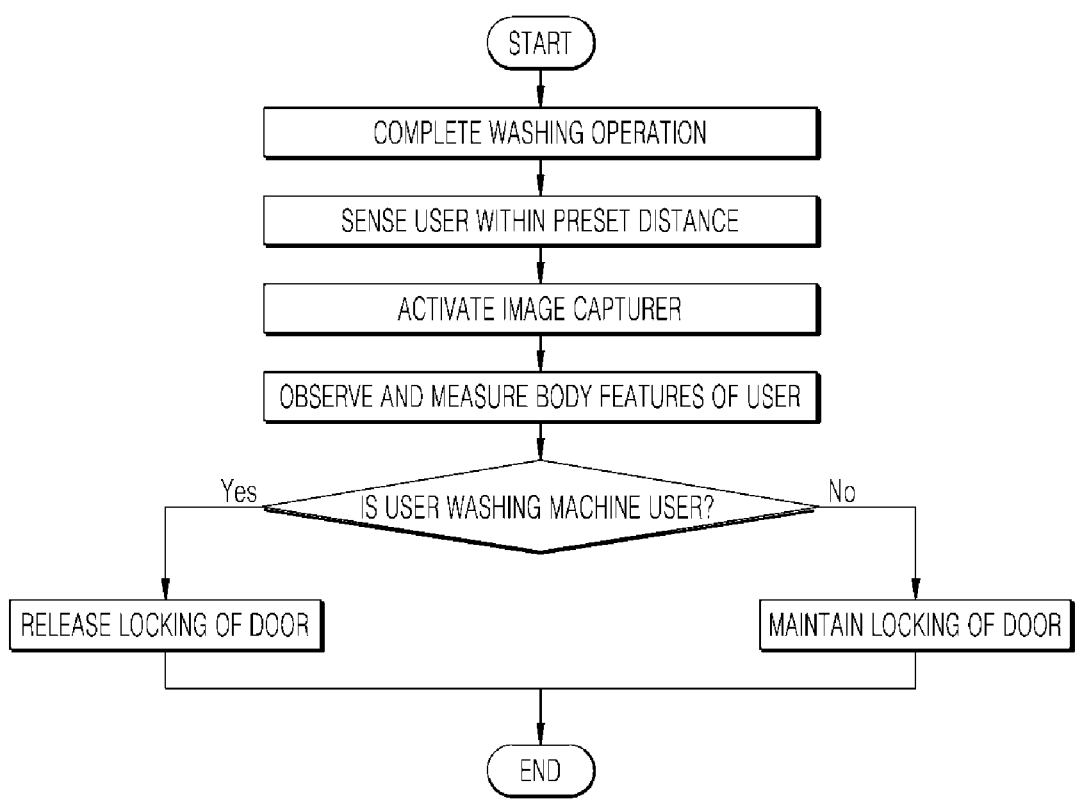
FIG. 12 is a flowchart illustrating an example in which a laundry security function of the washing machine according to the present disclosure is executed.

FIG. 12 is a flowchart illustrating an example in which a laundry security function of the washing machine according to the present disclosure is executed.

Referring to FIG. 12, after the washing operation is completed, when a user who is present within the preset proximity distance from the washing machine 1 (hereinafter referred to as a "third end-time user") is sensed, the image capturer 100 captures an image of the third end-time user, and the controller 700 identifies whether the third end-time user is the washing machine user.

When the third end-time user is identified to be the washing machine user by the identification function of the controller 700, the controller 700 performs control such that the door 20 is unlocked, thereby enabling the third end-time user to open the door 20 and to retrieve the laundry.

However, when the third end-time user is identified not to be the washing machine user by the identification function of the controller 700, the controller 700 performs control such that the door 20 is maintained in the locked state, thereby preventing the laundry from being stolen by a person other than the washing machine user.

The configuration for controlling the door 20 to be locked or the configuration for controlling the door 20 to be unlocked may employ the configuration for controlling the door of the conventional washing machine to be locked or unlocked.

Next, an example in which the controller 700 controls the user interface will be described with reference to the drawings.

Referring to FIG. 7, when the start-time user, who is sensed within a preset specific distance (hereinafter referred to as a "preset visible distance") from the washing machine 1 and is photographed by the image capturer 100, is identified to be the registered user by the identification function of the controller 700, the controller 700 may perform control such that the registered user interface, which is designated by the start-time user and is stored in the data storage element, is provided. In this case, the preset visible distance may be set to be equal to the preset proximity distance.

For example, in the case in which the start-time user, who is the registered user, designates and stores a registered user interface in which a male voice is output from the voice output interface 400 as a sound expressed in a human language and such that visual information displayed through the display 500 has a yellow color, when the start-time user is sensed and is identified to be the registered user, the controller 700 may perform control such that a male voice is output from the voice output interface 400 and such that yellow visual information is displayed through the display 500.

On the other hand, when the start-time user, who is sensed within the preset visible distance and is photographed by the image capturer 100, is identified not to be the registered user by the identification function of the controller 700 but inputs a command to open the door 20, the controller 700 may perform control such that a user interface set in the washing machine 1 as a default option (hereinafter referred to as a "default user interface"), which includes a sound that is output through the voice output interface 400 and visual information that is displayed through the display 500, is provided.

Figure 8:
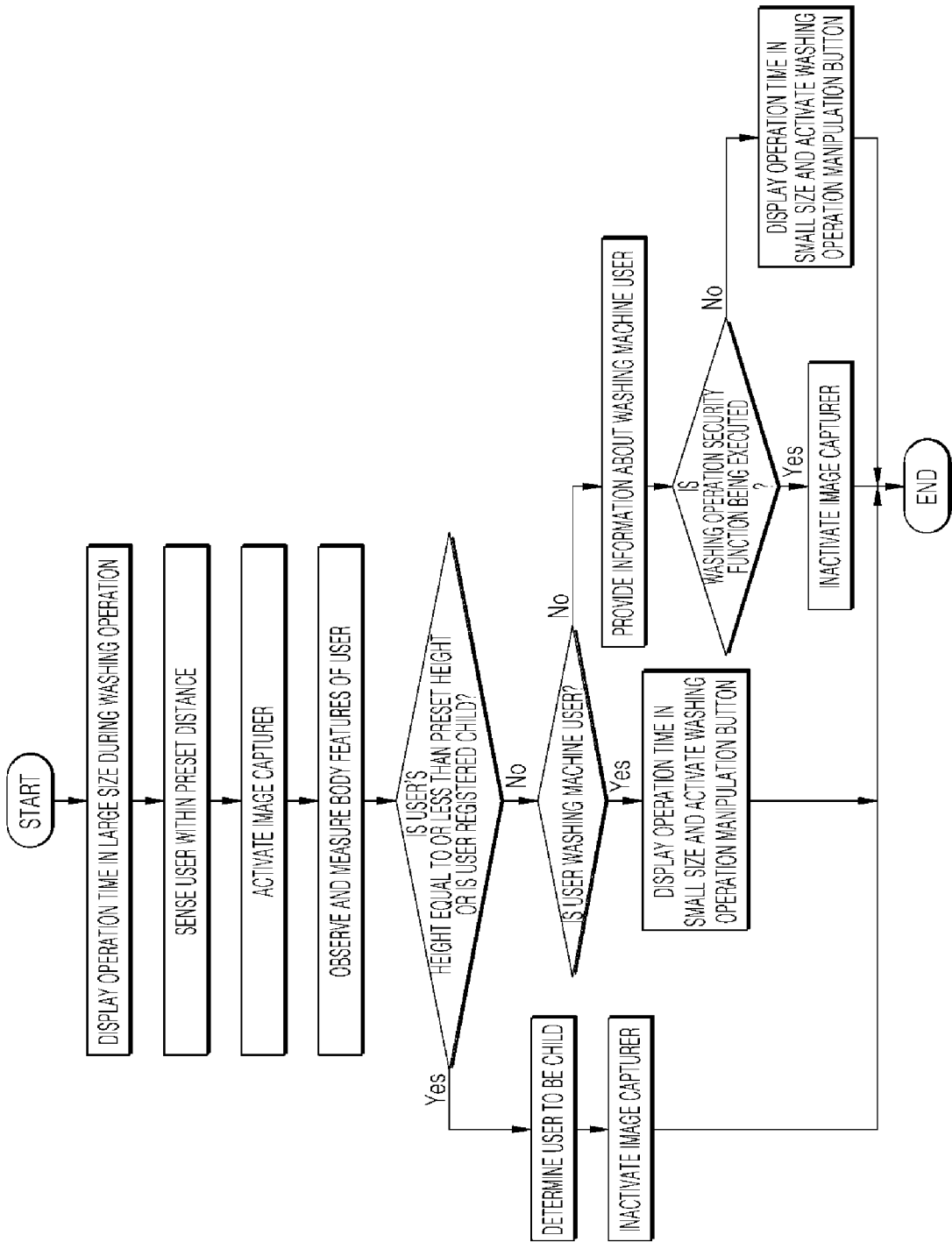
FIG. 8 is a flowchart illustrating an example of operation of the washing machine according to the present disclosure, which is performed when a user approaches the washing machine while the washing operation is being performed.

FIG. 8 is a flowchart illustrating an example of the operation of the washing machine according to the present disclosure, which is performed when a user approaches the washing machine while the washing operation is being performed.

An example in which the controller 700 executes a washing operation security function by controlling the user interface will be described with reference to FIG. 8. When a user who is sensed within the preset visible distance from the washing machine 1 and is photographed by the image capturer 100 (hereinafter referred to as an "intermediate-time user") is identified to be the washing machine user by the controller 700, the controller 700 performs control such that a washing operation manipulation button provided in the display 500 is activated so that the intermediate-time user is capable of changing the washing operation.

On the other hand, when the intermediate-time user is identified not to be the washing machine user by the controller 700, the controller 700 performs control such that a washing operation security function is executed so as to prevent the washing operation manipulation button provided in the display 500 from being activated, thereby preventing the intermediate-time user from changing the washing operation.

When the washing machine according to the present disclosure is used as a commercial washing machine, the controller 700 may perform control such that the usage fee of the washing machine 1 is automatically paid by the washing machine user using the identification function of the controller 700. For example, after identifying the washing machine user, the controller 700 may make the washing machine user pay the usage fee of the washing machine 1 together with a well-known automatic payment system.

In addition, the controller 700 may control the voice output interface 400 or the display 500 in order to deliver a message to a specific user.

For example, after a user designates a specific registered user as a recipient and stores a voice message using the voice recognizer 300 or stores an image message using the image capturer 100, when the user is photographed by the image capturer 100 within the preset visible distance and is identified to be the designated message recipient by the identification function of the controller 700, the controller 700 may perform control such that a voice message is output from the voice output interface 400 or an image message is output from the display 500.

Also, when a user is not sensed within the preset visible distance, the controller 700 may perform control such that the image capturer 100 is turned off, and when a user approaching an area within the preset visible distance is sensed, the controller 700 may perform control such that the image capturer 100 is turned on.

Also, the controller 700 may control the display 500 according to the distance between the washing machine 1 and the user. For example, referring to FIGS. 5 and 8, when the distance between the washing machine 1 and the user is measured to be equal to or greater than the preset visible distance by the sensor 200, the controller 700 may perform control such that the display 500 displays only the operation time of the washing operation in a large size. On the other hand, when the sensor 200 senses a user approaching an area within the preset visible distance from the washing machine 1, the controller 700 may perform control such that the display 500 displays the operation time of the washing operation in a small size and activates the washing operation manipulation button. Symbols such as letters and digits displayed on the display 500 may be controlled to increase in size in proportion to the distance between the washing machine 1 and the user.

Also, referring to FIGS. 6, 10, and 11, when the sensor 200 senses a user within the preset visible distance after completion of the washing operation, the controller 700 may perform control such that the display 500 displays a message indicating completion of the washing operation and the unattended time.

Hereinafter, the operation and effect of the washing machine according to the present disclosure having the configuration described above will be described in detail.

First, an example of the operation of the washing machine according to the present disclosure, which is performed when a user approaches the washing machine 1 in order to start the washing operation will be described with reference to FIG. 7.

When the washing machine 1 is in a standby state and the sensor 200 senses a user approaching an area within the preset proximity distance, the image capturer 100 is activated.

When the image data of the user captured by the image capturer 100 and the height of the user measured by the sensor 200 are transmitted to the controller 700, the controller 700 identifies the user. When identifying the user to be a child, the controller 700 performs control such that the door safety function is activated, and when identifying the user not to be a child, the controller 700 identifies whether the user is the registered user.

When the user who is identified not to be a child is identified to be the registered user, the controller 700 performs control such that the door 20 is opened, and in the case in which the user has stored the registered user interface, the controller 700 performs control such that the stored registered user interface is provided. On the other hand, when the user who is identified not to be a child is identified not to be the registered user, the controller 700 performs control such that an inquiry about whether to open the door 20 is output to the user in the form of a voice through the voice output interface 400 or in the form of visual information through the screen of the display 500.

In response to the inquiry about whether to open the door 20, when the user inputs a command to open the door 20, the controller 700 performs control such that the door 20 is opened and such that the default user interface is provided, and when the user does not input a command to open the door 20, the controller 700 performs control such that the image capturer 100 is inactivated.

Next, an example of the operation of the washing machine according to the present disclosure, which is performed when a user approaches the washing machine 1 during the washing operation will be described with reference to FIG. 8.

During the washing operation in which the operation time of the washing operation is displayed in a large size on the display 500, when a user approaching an area within the preset proximity distance is sensed, the image capturer 100 is activated.

When the image data of the user captured by the image capturer 100 and the height of the user measured by the sensor 200 are transmitted to the controller 700, the controller 700 identifies the user. When identifying the user to be a child, the controller 700 performs control such that the door safety function is activated, and when identifying the user not to be a child, the controller 700 identifies whether the user is the washing machine user.

When the user who is identified not to be a child is identified to be the washing machine user, the controller 700 performs control such that the operation time of the washing operation is displayed in a small size on the display 500 and such that a washing operation change button is activated. On the other hand, when the user who is identified not to be a child is identified not to be the washing machine user, the controller 700 performs control such that information about the washing machine user is output in the form of a voice through the voice output interface 400 or in the form of visual information through the screen of the display 500.

Also, when the washing operation security function is being executed, the controller 700 performs control such that the image capturer 100 is inactivated without changing the information displayed on the display 500, and when the washing operation security function is not being executed, the controller 700 performs control such that the operation time of the washing operation is displayed in a small size on the display 500 and such that the washing operation change button is activated.

Next, an example of the operation of the washing machine according to the present disclosure, which is performed when a user approaches the washing machine 1 after completion of the washing operation will be described with reference to FIGS. 9 to 11.

Referring to FIG. 9, after the washing operation is completed, opening and closing of the door 20 is controlled according to the amount of laundry introduced into the washing machine 1. Specifically, when the amount of laundry is small and thus the laundry does not fall out of the washing machine 1 when the door 20 is opened, the controller 700 performs control such that the door 20 is opened in order to prevent generation of odors in the laundry. When the amount of laundry is large, the controller 700 performs control such that the door 20 is not opened in order to prevent the laundry from falling out of the washing machine, thus preventing the laundry from being contaminated.

Referring to FIG. 10, in the state in which the door 20 is closed due to the large amount of laundry after completion of the washing operation, when a user approaching an area within the preset proximity distance from the washing machine 1 is sensed, the image capturer 100 is activated.

When the image data of the user captured by the image capturer 100 and the height of the user measured by the sensor 200 are transmitted to the controller 700, the controller 700 identifies the user. When identifying the user to be a child, the controller 700 performs control such that the door safety function is activated, and when identifying the user not to be a child, the controller 700 controls the notification function such that a message indicating completion of the washing operation and the unattended time are output in the form of a voice through the voice output interface 400 or in the form of visual information through the screen of the display 500. Also, the controller 700 performs control such that an inquiry about whether to open the door 20 is output to the user in the form of a voice through the voice output interface 400 or in the form of visual information through the screen of the display 500.

In response to the inquiry about whether to open the door 20, when the user inputs a command to open the door 20, the controller 700 performs control such that the door 20 is opened, and when the user retrieves the laundry, the controller 700 performs control such that the notification function is inactivated. When the user does not input a command to open the door 20, the controller 700 performs control such that the door 20 is not opened.

Referring to FIG. 11, in the state in which the door 20 has been opened due to the small amount of laundry after completion of the washing operation, when a user approaching an area within the preset proximity distance from the washing machine 1 is sensed, the image capturer 100 is activated.

When the image data of the user captured by the image capturer 100 and the height of the user measured by the sensor 200 are transmitted to the controller 700, the controller 700 identifies the user. When identifying the user to be a child, the controller 700 performs control such that the door safety function is activated, and when identifying the user not to be a child, the controller 700 controls the notification function such that a message indicating completion of the washing operation and the unattended time are output in the form of a voice through the voice output interface 400 or in the form of visual information through the screen of the display 500.

When the user retrieves the laundry from the washing machine 1, the controller 700 performs control such that the notification function is inactivated.

As described above, according to the washing machine of the present disclosure, when a person approaches the washing machine, whether the person is a user registered in the washing machine is identified, and the door of the washing machine is opened only for a user who desires to perform a washing operation, for convenience therefor. Also, opening and closing of the door of the washing machine is controlled based on accurate sensing of a child approaching the washing machine, and accordingly it is possible to effectively prevent an accident in which a child becomes trapped inside the washing machine.

In addition, since opening of the door is controlled according to the amount of laundry after completion of the washing operation, it is possible to prevent or minimize the generation of odors in the laundry. Also, when the amount of laundry is large, it is possible to prevent the laundry from falling out of the washing machine, thus preventing the laundry from being contaminated.

In addition, as the distance between the washing machine and the user increases, the operation time of the washing operation is displayed in a larger size, thus enabling the user to easily recognize the operation time of the washing operation.

In addition, since the operation of the door is controlled based on recognition of the user's voice, it is possible to enable a user who has difficulty moving around to conveniently open the door of the washing machine.

In addition, each user is capable of storing his/her preferred user interface in the washing machine, and a user interface corresponding to the currently identified user is provided. Accordingly, each user is capable of conveniently using the washing machine.

In addition, since the washing machine delivers a message based on identification of a recipient, the message is accurately delivered to the designated recipient.

In addition, when a user approaches the washing machine after completion of the washing operation, the washing machine notifies the user of completion of the washing operation and the amount of time that the laundry has been left unattended, thereby enabling the user to retrieve the laundry without leaving the laundry unattended for a long time, thus preventing the generation of odors in the laundry.

In addition, after completion of the washing operation, only the owner of the laundry, who started operation of the washing machine, is authorized to open the door, and accordingly it is possible to prevent the laundry from being stolen.

In addition, since the image capturer for identifying a user is configured to be freely mounted to and demounted from the washing machine, it is possible to mount the image capturer to the existing washing machine, and accordingly it is not necessary to purchase a separate washing machine, thus reducing costs.

While the foregoing has been given by way of illustrative example of the present disclosure, all such and other modifications and variations thereto as would be apparent to those skilled in the art are deemed to fall within the broad scope and ambit of this disclosure as is herein set forth. Accordingly, such modifications or variations are not to be regarded as a departure from the spirit or scope of the present disclosure, and it is intended that the present disclosure cover the modifications and variations of this disclosure provided they come within the scope of the appended claims and their equivalents.

According to the washing machine of the present disclosure, when a person approaches the washing machine, whether the person is a user registered in the washing machine is identified, and the door of the washing machine is opened only for a user who desires to perform a washing operation, for convenience therefor. Also, opening and closing of the door of the washing machine is controlled based on accurate sensing of a child approaching the washing machine, and accordingly it is possible to effectively prevent an accident in which a child becomes trapped inside the washing machine.

In addition, since opening of the door is controlled according to the amount of laundry after completion of the washing operation, it is possible to prevent or minimize the generation of odors in the laundry. Also, when the amount of laundry is large, it is possible to prevent the laundry from falling out of the washing machine, thus preventing the laundry from being contaminated.

In addition, as the distance between the washing machine and the user increases, the controller performs control such that the operation time of the washing operation is displayed in a larger size, thus enabling the user to easily recognize the operation time of the washing operation.

In addition, since the controller controls the operation of the door based on recognition of the user's voice by the voice recognizer, it is possible to enable a user who has difficulty moving around to conveniently open the door of the washing machine.

In addition, each user is capable of storing his/her preferred user interface in the storage, and the controller provides a user interface corresponding to the currently identified user. Accordingly, each user is capable of conveniently using the washing machine.

In addition, since the washing machine delivers a message based on identification of a recipient, the message is accurately delivered to the designated recipient.

In addition, when a user approaches the washing machine after completion of the washing operation, the voice output interface or the display notifies the user of completion of the washing operation and the amount of time that the laundry has been left unattended, thereby enabling the user to retrieve the laundry without leaving the laundry unattended for a long time, thus preventing the generation of odors in the laundry.

In addition, after completion of the washing operation, only the owner of the laundry, who started operation of the washing machine, is authorized to open the door, and accordingly it is possible to prevent the laundry from being stolen.

In addition, since the image capturer for identifying a user is configured to be freely mounted to and demounted from the washing machine, it is possible to mount the image capturer to the existing washing machine, and accordingly it is not necessary to purchase a separate washing machine, thus reducing costs.

What is claimed is:

1. A washing machine comprising:
   an image capturer configured to capture an image;
   a storage configured to store data including registered user data, the registered user data including image data of a registered user or a plurality of registered users; and
   a controller configured to:
      compare photographed data captured by the image capturer to the stored data to thereby determine whether the photographed data correspond to the stored data, and
      control components of the washing machine,
   wherein the controller is further configured to:
      based on the washing machine being in a standby state, determine whether the photographed data of a user approaching the washing machine correspond to the registered user data,
      based on determining that the photographed data of the user correspond to the registered user data, recognize the user as the registered user or one of the plurality of registered users, and
      based on recognizing the user as the registered user or one of the plurality of registered users, perform control the washing machine to open a door of the washing machine,
   wherein the image capturer comprises:
      a lower box made of a non-magnetic material and coupled to the washing machine, and
      an upper box made of a non-magnetic material and configured to be detachably attached to the lower box,
   wherein the lower box comprises:
      a first wireless charging element comprising a coil, and
      a first magnetic coupling element comprising a permanent magnet, the first magnetic coupling element being spaced apart from the first wireless charging element, and
   wherein the upper box comprises:
      a wireless communication module,
      a battery, a second wireless charging element configured to receive power from the first wireless charging element to thereby charge the battery, a second magnetic coupling element comprising a magnetic body, the second magnetic coupling element being spaced apart from the second wireless charging element and configured to face the first magnetic coupling element based on the upper box being attached to the lower box, and an image-capturing element comprising a camera.

2. The washing machine according to claim 1, wherein the stored data comprise a child data including image data of a child or children, and wherein the controller is further configured to:
based on the washing machine being in the standby state, determine whether the photographed data correspond to the child data,
based on determining that the photographed data correspond to the child data and that the door is in an open state, control the washing machine to maintain the door in the open state.

3. The washing machine according to claim 2, wherein the controller is further configured to:
based on determining that the photographed data correspond to the child data and that the door is in a closed state, control the washing machine to maintain the door in the closed state.

4. The washing machine according to claim 1, further comprising:
a distance detection sensor configured to sense the user and to measure a distance between the washing machine and the user,
wherein the controller is further configured to:
compare the distance measured by the distance detection sensor with a preset proximity distance, and
based on determining that the distance between the washing machine and the user is less than the preset proximity distance, control the washing machine to open the door.

5. The washing machine according to claim 1, further comprising:
a height detection sensor configured to measure a height of the user,
wherein the controller is further configured to:
compare the height measured by the height detection sensor with a preset safety height,
based on determining that the height measured by the height detection sensor is less than or equal to the preset safety height and that the door is in an open state, control the washing machine to maintain the door in the open state, and
based on determining that the height measured by the height detection sensor is less than or equal to the preset safety height and that the door is in a closed state, control the washing machine to maintain the door in the closed state.

6. The washing machine according to claim 1, further comprising:
a weight detection sensor configured to measure a weight of laundry,
wherein the controller is further configured to:
compare the weight of the laundry measured after completion of a washing operation with a preset reference weight, and
based on determining that the weight of the laundry measured after completion of the washing operation is less than or equal to the preset reference weight, control the washing machine to open the door.

7. The washing machine according to claim 1, further comprising:
a height detection sensor configured to measure a height of laundry,
wherein the controller is further configured to:
compare the height of the laundry measured after completion of a washing operation with a preset reference height, and
based on determining that the height of the laundry measured after completion of the washing operation is less than or equal to the preset reference height, control the washing machine to open the door.

8. The washing machine according to claim 4, further comprising:
a voice recognizer configured to recognize an input voice of the user; and
a voice output interface configured to output an output voice,
wherein the controller is further configured to:
control at least one of the components of the washing machine based on the input voice, and
based on determining the user photographed by the image capturer is not included the registered user data, control the voice output interface to output the output voice that provides information on a user registration procedure to thereby allow the user to update the registered user data to include the user.

9. The washing machine according to claim 8, wherein the controller is further configured to:
based on a washing operation being completed, control the voice output interface to output the output voice that indicates completion of the washing operation, and
based on sensing the user within the preset proximity distance by the distance detection sensor, control the voice output interface to output the output voice indicating an amount of time elapsed since completion of the washing operation.

10. The washing machine according to claim 9, wherein the controller is further configured to:
based on determining that the washing machine is in the standby state, that the door is in a closed state, and that the user sensed within the preset proximity distance is not included in the registered user data, control the voice output interface to output the output voice inquiring the user about whether to open the door, and
based on recognizing the input voice as a voice command of the user to open the door, control the washing machine to open the door.

11. The washing machine according to claim 1, wherein the storage is configured to store washing machine user data including image data of one or more users that operate the washing machine, and
wherein the controller is configured to, based on determining that the photographed data correspond to the washing machine user data, control the washing machine to open the door after completion of a washing operation.

12. A washing machine comprising:
an image capturer configured to capture an image;
a storage configured to store data including registered user data and interface data on a user interface of the washing machine, the registered user data including image data of a registered user or a plurality of registered users;

a controller configured to:
  compare photographed data of a user captured by the image capturer with the stored data to thereby determine whether the photographed data correspond to the stored data, and
  control components of the washing machine; and
a display configured to display the user interface of the washing machine and to change the user interface to another interface based on control of the controller, the display being configured to display information on a washing operation on a screen thereof,
wherein the interface data include a registered user interface data of one or more registered user interfaces that are set by the registered user or the plurality of registered users,
wherein the controller is further configured to:
  based on determining that the photographed data of the user correspond to the registered user data, recognize the user as the registered user or one of the plurality of registered users, and
  based on recognizing the user as the registered user or one of the plurality of registered users, change the user interface of the washing machine to a registered user interface included in the registered user interface data,
wherein the image capturer comprises:
  a lower box made of a non-magnetic material and coupled to the washing machine, and
  an upper box made of a non-magnetic material and configured to be detachably attached to the lower box,
wherein the lower box comprises:
  a first wireless charging element comprising a coil, and
  a first magnetic coupling element comprising a permanent magnet, the first magnetic coupling element being spaced apart from the first wireless charging element, and
wherein the upper box comprises:
  a wireless communication module,
  a battery,
  a second wireless charging element configured to receive power from the first wireless charging element to thereby charge the battery,
  a second magnetic coupling element comprising a magnetic body, the second magnetic coupling element being spaced apart from the second wireless charging element and configured to face the first magnetic coupling element based on the upper box being attached to the lower box, and
  an image-capturing element comprising a camera.

13. The washing machine according to claim 12, further comprising:
a distance detection sensor configured to sense the user and to measure a distance between the washing machine and the user,
wherein the controller is further configured to control the display to change a configuration of the screen of the display according to the distance between the washing machine and the user.

14. The washing machine according to claim 13, wherein the controller is further configured to:
compare the distance measured by the distance detection sensor with a preset visible distance,
based on determining that the distance between the washing machine and the user is greater than the preset visible distance, control the display to display an operation time of the washing operation without a washing operation manipulation button, and
control the display to change a displayed size of the operation time in proportion to the distance between the washing machine and the user.

15. The washing machine according to claim 14, wherein the controller is further configured to:
based on sensing the user within the preset visible distance by the distance detection sensor during the washing operation, control the display to display the operation time of the washing operation and the washing operation manipulation button, and
control the display to change the displayed size of the operation time in proportion to the distance between the washing machine and the user while displaying the operation time of the washing operation and the washing operation manipulation button.

16. The washing machine according to claim 15, further comprising:
a voice output interface configured to output an output voice,
wherein the controller is further configured to, based on determining that the user photographed by the image capturer is not included the registered user data, control the voice output interface to output the output voice that provides information on a user registration procedure to thereby allow the user to update the registered user data to include the user.

17. The washing machine according to claim 16, wherein the voice output interface is configured to change a type of the output voice.

18. The washing machine according to claim 17, wherein the controller is configured to, based on detecting that an unregistered user not included in the registered user data operates the washing machine, control the display to output a default user interface.

19. The washing machine according to claim 18, further comprising:
a voice recognizer configured to recognize an input voice of the user,
wherein the storage is configured to store a voice message through the voice recognizer or an image message through the image capturer, and
wherein the controller is further configured to:
  allow the user to set a recipient from among the plurality of registered users, and
  based on detecting the recipient within the preset visible distance by the distance detection sensor, control the voice output interface to output the voice message or control the display to output the image message.

20. A washing machine comprising:
an image capturer configured to capture an image;
a storage configured to store data including registered user data, the registered user data including image data of a registered user or a plurality of registered users; and
a controller configured to:
  compare photographed data captured by the image capturer to the stored data to thereby determine whether the photographed data correspond to the stored data, and
  control components of the washing machine,
wherein the controller is further configured to:
  based on the washing machine being in a standby state, determine whether the photographed data of a user approaching the washing machine correspond to the registered user data, based on determining that the photographed data of the user correspond to the registered user data, recognize the user as the registered user or one of the plurality of registered users, and based on recognizing the user as the registered user or one of the plurality of registered users, perform control the washing machine to open a door of the washing machine, wherein the washing machine further comprises a height detection sensor configured to measure a height of the user, and wherein the controller is further configured to:

compare the height measured by the height detection sensor with a preset safety height, based on determining that the height measured by the height detection sensor is less than or equal to the preset safety height and that the door is in an open state, control the washing machine to maintain the door in the open state, and based on determining that the height measured by the height detection sensor is less than or equal to the preset safety height and that the door is in a closed state, control the washing machine to maintain the door in the closed state.

* * * * *